United States Patent [19]

Hisano

[11] Patent Number: 4,630,225
[45] Date of Patent: Dec. 16, 1986

[54] SYSTEM FOR DETECTING ORIENTATION OF ARTICLES

[75] Inventor: Atushi Hisano, Nagaokakyo, Japan
[73] Assignee: Omron Tateisi Electronic Co., Kyoto, Japan
[21] Appl. No.: 536,508
[22] Filed: Sep. 28, 1983
[30] Foreign Application Priority Data Sep. 29, 1982 [JP] Japan ................................ 57-172039

[51] Int. Cl.⁴ ...................... G01B 11/02; G01B 11/03; G06K 9/28
[52] U.S. Cl. ........................................ 364/559; 382/8; 382/48; 356/394; 358/101
[58] Field of Search ....................... 364/559, 513, 578; 901/7, 46, 47; 358/93, 101, 107; 382/8, 46, 48; 356/394

[56] References Cited

U.S. PATENT DOCUMENTS

| | | | |
|---|---|---|---|
| 3,804,270 | 4/1974 | Michaud et al. | 364/513 |
| 3,898,617 | 8/1975 | Kashioka et al. | 382/48 |
| 4,017,721 | 4/1977 | Michaud | 364/513 |
| 4,105,925 | 8/1978 | Rossol et al. | 901/7 |
| 4,146,924 | 3/1979 | Birk et al. | 364/513 |
| 4,281,342 | 7/1981 | Ueda et al. | 364/478 |
| 4,305,130 | 12/1981 | Kelley et al. | 364/478 |
| 4,344,146 | 8/1982 | Davis, Jr. et al. | 901/47 |
| 4,402,053 | 8/1983 | Kelley et al. | 364/478 |

OTHER PUBLICATIONS

Simpson, John A., "Automation Research at N.B.S.", May 1981, pp. 3-6.
Andreiev, Nikita, "Machines Identify, Measure, and Inspect, Yet Fall Short of Vision", Control Engineering, Nov. 1980, pp. 73-76.

Primary Examiner—Errol A. Krass
Assistant Examiner—Joseph L. Dixon
Attorney, Agent, or Firm—Cushman, Darby & Cushman

[57] ABSTRACT

Data relating to the distances between each of all the feature points of the article to be checked and the other feature points thereof is stored in a memory in advance. The image of the article is picked up by a camera, and the resulting image data is stored in another memory. With use of a computer, data relating to the distances of at least two of the feature points of the article from other feature points thereof is obtained from the image data. The two feature points are identified by checking the data relating to the distances of the two feature points from other feature points with reference to the stored data relating to the distances between each feature point and the other feature points. The orientation of the article is determined based on the direction through the two identified feature points.

7 Claims, 18 Drawing Figures

| | P1 | P2 | P3 | P4 | P5 | P6 | P7 | P8 | P9 | P10 |
|---|---|---|---|---|---|---|---|---|---|---|
| 1 | ○ | ○ | ○ | | | ○ | ○ | ○ | ○ | ○ |
| $\sqrt{2}$ | ○ | ○ | ○ | | | | ○ | ○ | ○ | ○ |
| 2 | | ○ | ○ | ○ | ○ | ○ | ○ | ○ | ○ | |
| $\sqrt{5}$ | ○ | ○ | ○ | ○ | ○ | ○ | ○ | ○ | ○ | ○ |
| $2\sqrt{2}$ | | ○ | ○ | ○ | ○ | ○ | | ○ | ○ | |
| 3 | | ○ | | ○ | | ○ | | | | ○ |
| $\sqrt{10}$ | ○ | | | ○ | | ○ | | | | |
| $\sqrt{13}$ | | ○ | | | ○ | | | | | ○ |
| 4 | | | | ○ | | | | | ○ | |
| $\sqrt{17}$ | | | | ○ | ○ | | | ○ | | |
| $3\sqrt{2}$ | ○ | | | | ○ | | | | | |
| $2\sqrt{5}$ | | | | | ○ | | | | ○ | |

FIG. 6

| DISTANCE | SET OF FEATURE POINTS |
|---|---|
| 1 | P1, P2, P3, P6, P7, P8, P9, P10 |
| $\sqrt{2}$ | P1, P2, P3, P7, P8, P9, P10 |
| 2 | P2, P3, P4, P5, P6, P7, P8, P9 |
| $\sqrt{5}$ | |
| $2\sqrt{2}$ | |
| ⋮ | ⋮ |
| $2\sqrt{5}$ | P5, P9 |

FIG. 7

| DIRECTION THROUGH FEATURE POINTS | ANGLE WITH REFERENCE DIRECTION |
|---|---|
| P1P2 | 0° |
| P1P3 | 315° |
| ⋮ | ⋮ |
| P2P3 | 270° |
| ⋮ | ⋮ |

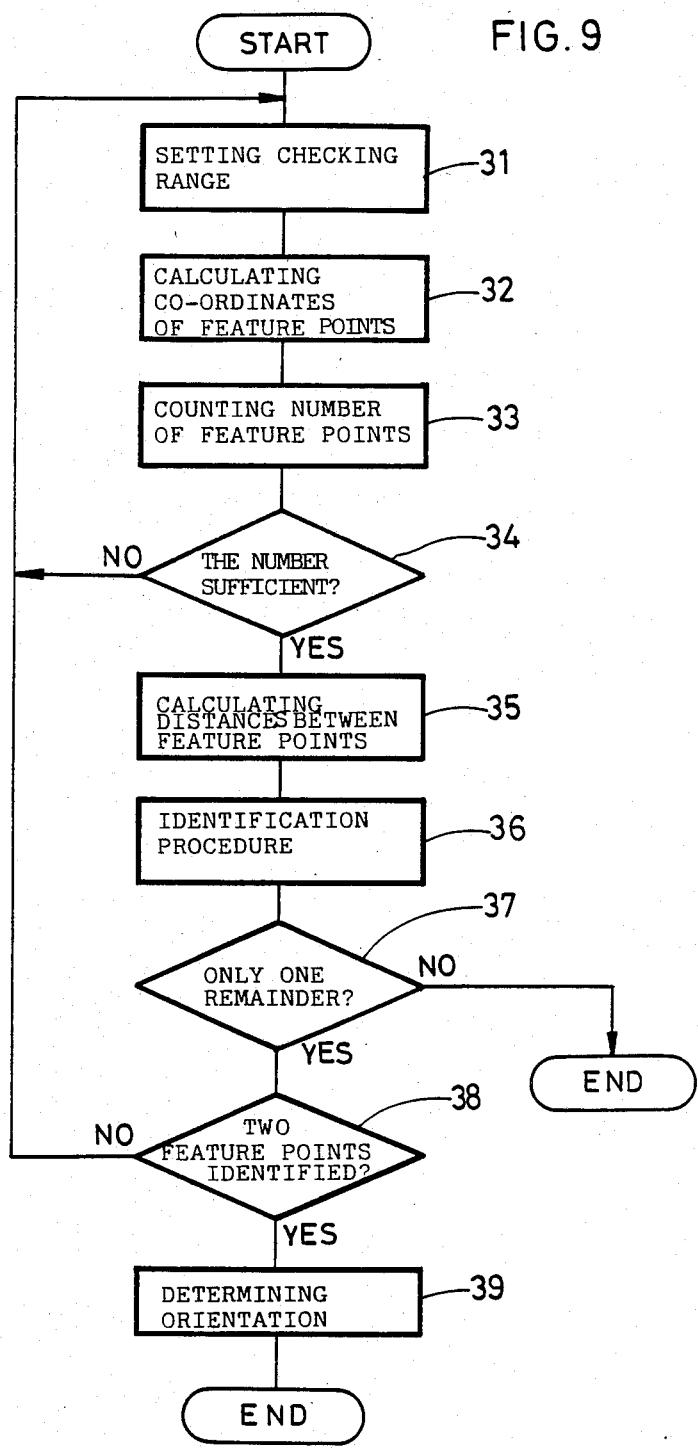

SYSTEM FOR DETECTING ORIENTATION OF ARTICLES

BACKGROUND OF THE INVENTION

The present invention relates to a system for detecting the orientation of articles, for example, for detecting the positions or directions of workpieces being transported on a conveyor in a manufacturing factory relative to the direction of transport.

It is necessary to detect the orientation or bearings of workpieces on a conveyor in an automated system in which the workpieces are picked up by the manipulator of a robot because if the workpieces are sent forward as positioned in random directions, the manipulator fails to grasp the workpiece properly unless directed in accordance with the position of the workpiece.

Conventionally the orientations of articles were detected by picking up the color density pattern, color distribution or the like of the article by a camera and checking the resulting image by a pattern recognition technique with reference to a large number of reference patterns stored in a memory. However, this method involves the problem of necessitating storage of reference patterns for all orientations in a memory having a large capacity and requiring a long period of time for pattern checking.

SUMMARY OF THE INVENTION

The main object of the present invention is to make it possible to detect the orientations of articles with use of a memory of reduced capacity within a shortened period of time.

The present invention provides a system for detecting the orientation of an article comprising memory means for storing data relating to the distances between each of all the feature points of the article and the other feature points thereof, a camera for picking up the image of the article to give image data, means for obtaining from the image data data relating to the distances of at least two of the feature points of the article from other feature points, means for identifying said at least two feature points by checking the data relating to the distances of the two feature points from other feature points with reference to the stored data relating to the distances between each feature point and the other feature points, and means for determining the orientation of the article based on the direction through the two identified feature points.

The term "feature point" of an article refers to a point which is characteristic of the shape (including features as to color density and distribution) of the article, such as a corner or point where two lines or two or three planes intersect or join, or the center of a hole when the article has a hole. Useful as the camera is a TV camera, having a regular arrangement of a multiplicity of photoconductive cells or the like.

According to the present invention, the memory needs only to store the data relating to the distances between each of all the feature points of the article to be checked and the other feature points, so that the memory can be of small capacity. Further because the distance data as to at least two feature points obtained from the image data is checked with reference to the distance data as to every feature point stored in memory, the invention assures simplified processing which can be carried out within a shortened period of time.

BRIEF DESCRIPTION OF THE DRAWINGS

FIGS. 6 and 7 are memory maps, FIG. 6 showing data relating to the distances between the feature points, and FIG. 7 showing data as to the angles of directions through two feature points with respect to a reference direction;

FIG. 9 shows an orientation determining process executed by a CPU.

DESCRIPTION OF THE PREFERRED EMBODIMENT

Figure 1:
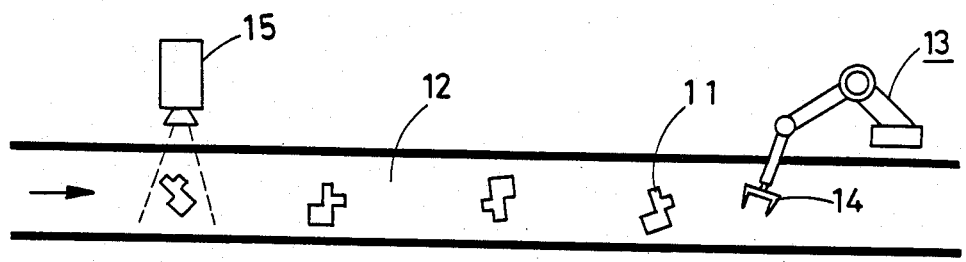
FIG. 1 shows the arrangement of an automated system to which the present invention is applied.

FIG. 1 shows an automated system to which the present invention is applied. The articles 11 to be checked are transported one by one on a belt conveyor 12. A robot 13 disposed on one side of the conveyor 12 has a manipulator 14 by which the articles 11 are grasped one by one and transferred to the next process. A camera 15 for picking up the image of the article 11 is provided to the rear of the robot 13 with respect to the direction of transport.

Figure 2:
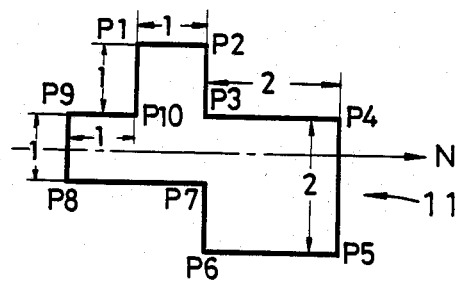
FIG. 2 shows an example of article to be checked.

FIG. 2 shows the article 11, which is a plate shaped two-dimensionally. The contour of the article 11 is defined by ten straight lines each of which is at a right angle with another. The ten corners are indicated at P1 to P10. These points P1 to P10 are feature points. The sides P1P2 (the side extending from point P1 to point P2, the other sides will be expressed similarly), P2P3, P6P7, P8P9, P9P10 and P10P1 all have a length of 1 unit ("unit" will be omitted hereinafter). The other sides P3P4, P4P5, P5P6 and P7P8 have a length of 2. A reference direction N is specified for the article 11.

Figure 3:
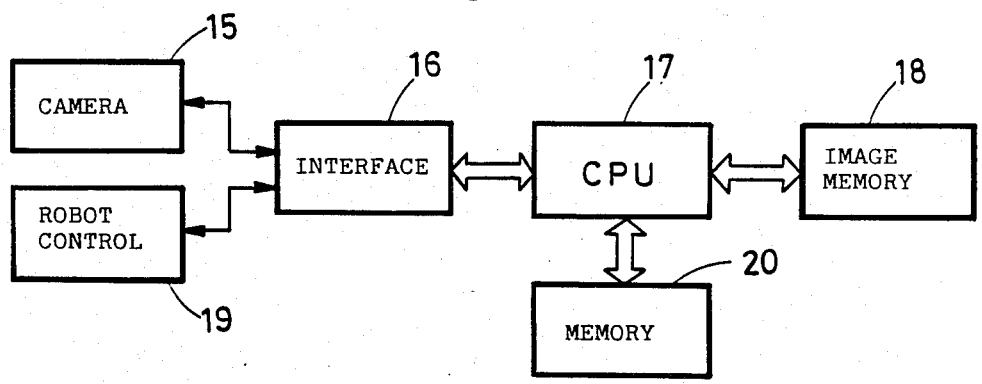
FIG. 3 is a block diagram showing the electrical construction of the automated system.

FIG. 3 schematically shows the construction of the automated system. As seen in FIG. 1, the articles 11 are transported on the belt conveyor 12 as positioned in random directions. The image of the article 11 is picked up by the camera 15, and the image data is fed to an image memory 18 via an interface 16 for temporary storage. As will be described in detail, the orientation of the article (the angle of the reference direction N with respect to the direction of transport) is detected by a CPU 17 using the image data. Based on the orientation detected, the direction of the manipulator 14 is controlled by a robot control unit 19. This enables the manipulator 14 to grasp the articles 11 always at a specified portion, e.g., at the side P3P4 and the side P5P6. A memory 20 has stored therein a program for the CPU 17, the data relating to the distances between the feature points of the article and the data relating to the angle of the direction through each two feature points with respect to the reference direction.

Figure 4A:
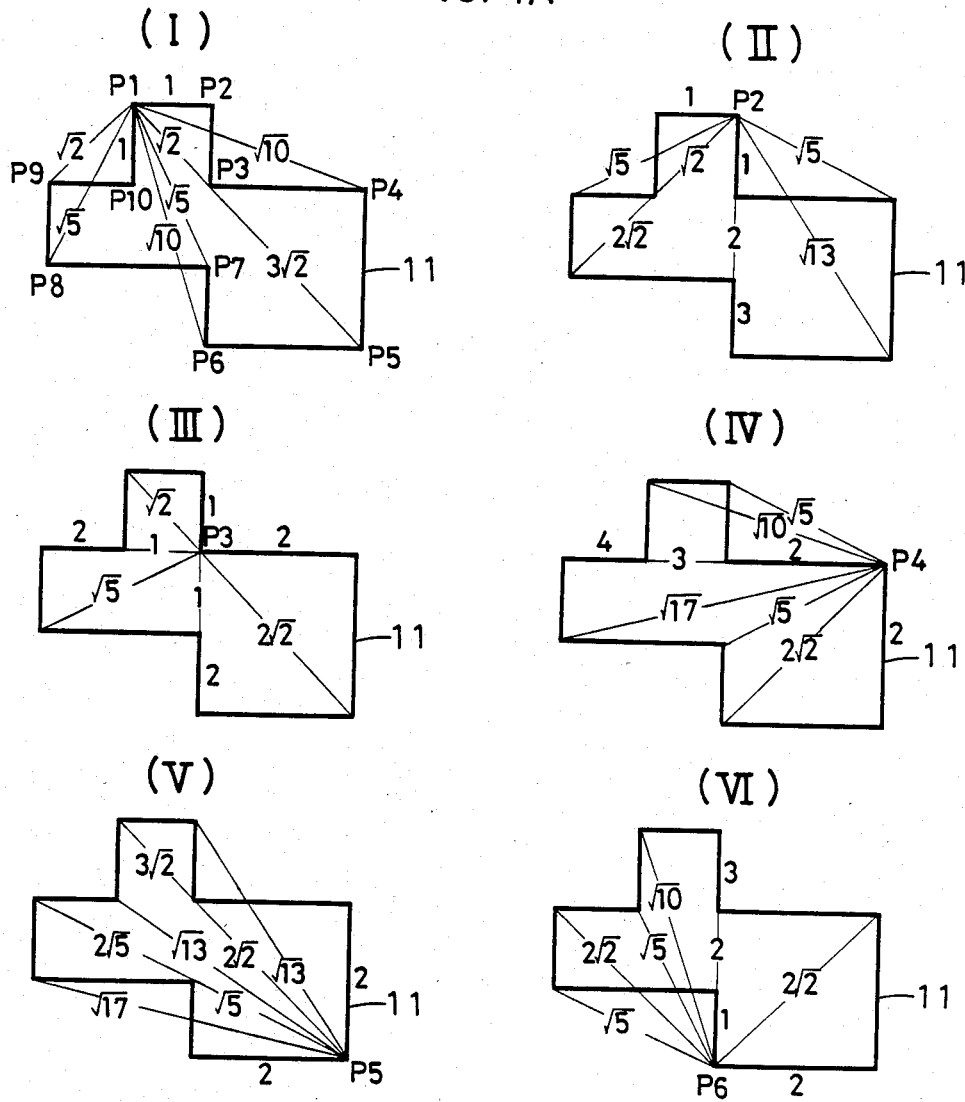
FIGS. 4A and 4B includes diagrams for illustrating the distances between each feature point of the article and the other feature points thereof.
Figure 4B:
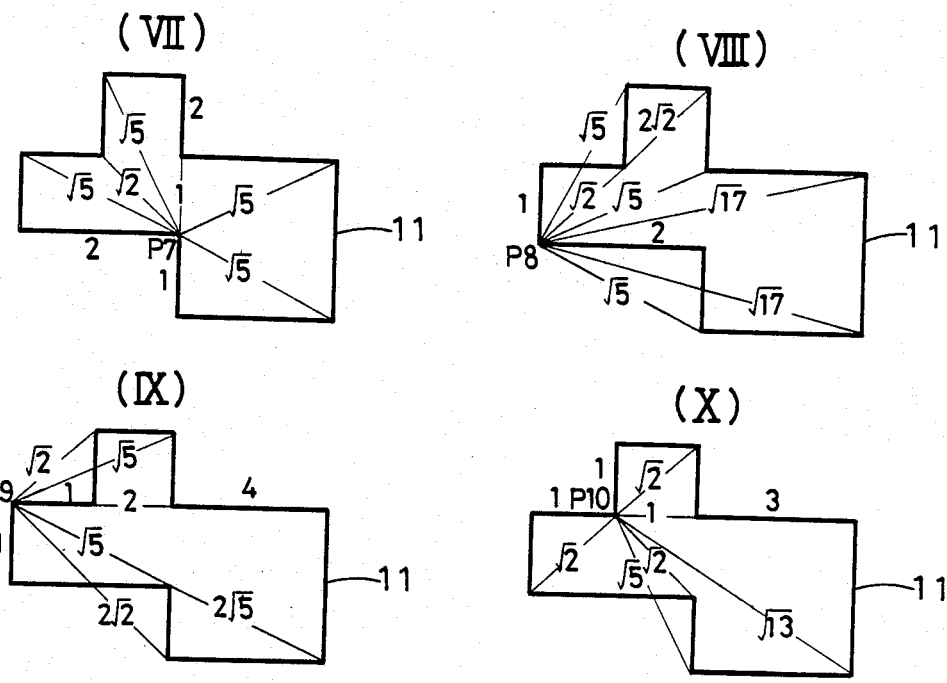

FIGS. 4A and 4B shows the distances between each of all the feature points P1 to P10 of the article 11 and the other feature points thereof. For example, the distances between the feature point P1 and the other feature points are P1P2=1, P1P3=√2, P1P4=√10, P1P5=3√2, P1P6=√10, P1P7=√5, P1P8=√5, P1P9=$\sqrt{2}$ and P1P10=1 (see FIG. 4, (I)). Accordingly insofar as the distance is concerned, the feature point P1 is associated only with the distances 1, $\sqrt{2}$, $\sqrt{5}$, $\sqrt{10}$ and $3\sqrt{2}$. Similarly, the feature point P2 is associated with the distances 1, $\sqrt{2}$, 2, $\sqrt{5}$, $2\sqrt{2}$, 3 and $\sqrt{13}$ (see FIG. 4, (II)).

Figures 5, 8:
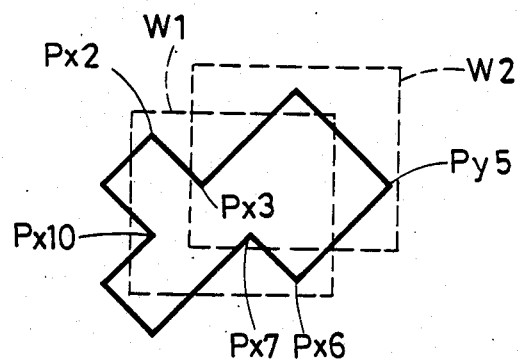
FIG. 5 shows the relation between the feature points and the distances.
FIG. 8 shows checking ranges.

In this way, the distances concerned with all the feature points are determined. FIG. 5 shows a summary of the relation between all the feature points and the distances concerned therewith. For example, the list manifestly shows that the feature point P3 is concerned with the distances of 1, $\sqrt{2}$, 2, $\sqrt{5}$ and $2\sqrt{2}$ (also see FIG. 4, (III)).

The relation of FIG. 5 between the feature points and the distances is listed according to the distance in FIG. 6. This is the data stored in the memory 20 and relating to the distances between the feature points. The symbols for the feature points concerned with each distance are stored as a set of feature points. A specified range may be set for each distance in view of the errors to be involved in the image pick-up by the camera 15, reading of the coordinates of the feature point from the image data and like process.

The memory 20 also has stored therein the data as to the angle of the direction through each two feature points with respect to the reference direction. This data is shown in FIG. 7. For example, the direction of the line P1P2 through the points P1 and P2 (i.e., the direction from P1 to P2) is the same as the reference direction N, so that the angle is 0°. Thus the memory 20 has stored therein the data relating to the directions (angles with respect to the reference direction N) through each feature point and the other feature points.

The CPU 17 determines the orientation of the article by the process shown in FIG. 9. It is assumed that the image memory 18 has already stored therein the data as to the article 11 picked up by the camera 15. As indicated at W1 in FIG. 8, a suitable checking range is set on the image memory 18 (step 31). The feature points included within the range W1 are detected, and the coordinates of these feature points are calculated (step 32). (The origin of the coordiante system is predetermined.) There are five feature points $P\times2$, $P\times3$, $P\times6$, $P\times7$ and $P\times10$ within the range W1, and the coordinates of these feature points are determined. Known methods are usable for detecting the feature points with use of the image data and for giving coordinates to the points. Further the number of the feature points within the range W1 is counted (step 33). If the number of feature points is not smaller than a predetermined number, a feature point can be identified, whereas if it is smaller, a checking range is set again so that a larger number of feature points will be included in the checking range (step 34). The initial checking range may be enlarged.

An optional feature point (e.g., $P\times2$) is selected from within the checking range W1, and the distances between the selected feature point and the other feature points within the range W1 are calculated based on the coordinates of the points (step 35). This steps gives $P\times2P\times3=1$, $P\times2P\times6=3$, $P\times2P\times7=2$ and $P\times2P\times10=\sqrt{2}$. Thus the feature point $P\times2$ is concerned with the distances of 1, $\sqrt{2}$, 2 and 3.

With use of the data (FIG. 6) relating to the distances between the feature points, an identification procedure is then executed to determine to which of the feature points P1 to P10 the point $P\times2$ corresponds (step 36). With reference to FIG. 5 which is more understandable than FIG. 6, the feature points P4 and P5 having no bearing on the distance of 1 are excluded first. Next, the point P6 which is not concerned with the distance of $\sqrt{2}$ is excluded. Subsequently the points P1 and P10 which are not concerned with the distance of 2 are excluded. The points P3, P7, P8 and P9 irrelevant to the distance of 3 are further excluded. Consequently, of the feature points P1 to P10, the point P2 alone remains as being possibly identical with the point $P\times2$. Since the feature point remaining unexcluded is one, it follows that the selected feature point $P\times2$ corresponds to this remaining point (step 37). With the present embodiment, $P\times2$ is found to be identical with P2. If two or more selected feature points remain, identification is impossible, and the article is removed from the conveyor. Alternatively, step 31 may follow for setting a checking range again.

The orientation of the article can be determined if two feature points are identified. Accordingly step 31 is repeated again (step 38) to set another checking range W2, for example. The same procedure as above is followed to determine that a feature point, e.g., Py5, within the range W2 is identical with P5.

The direction of the segment of line interconnecting the two feature points P2 and P5 is calculated based on the coordinates of the points. Further based on the calculated direction and the angle data shown in FIG. 7, the inclination (angle) of the reference direction N relative to the direction of transport is calculated (step 39).

When three feature points are identified in the case of two-dimensional articles as in the foreoing embodiment, it is possible to detect whether the article is positioned face up or down. Furthermore it will be readily understood that the orientations of three-dimensional articles can be detected with use of three feature points.

What is claimed is:

1. A system for detecting the orientation of an article comprising:

memory means for storing data relating to distances between each one of a plurality of feature points of the article and each of the others of said plurality of feature points;

a camera for picking up an image of the article to give image data, means, electrically connected to said camera, for obtaining from the image data data relating to the distances of at least two of the feature points of the article from other feature points, means, operatively connected to said memory means and said obtaining means, for identifying said at least two feature points by checking the data relating to the distances of said at least two feature points from other feature points with reference to the stored data relating to the distances between each one of a plurality of feature points and the other feature points, and means, operatively connected to said identifying means, for determining the orientation of the article based on a direction through said at least two identified feature points.

2. A system as defined in claim 1 wherein the article extends two-dimensionally, and the orientation of the article is determined based on the two feature points.

3. A system as defined in claim 1 wherein the article extends two-dimensionally, and the orientation of the article on the two-dimensional plane thereof and the front or rear side of the article are detected based on three feature points.

4. A system as defined in claim 1 wherein the article is three-dimensional, and the orientation of the article is determined based on three feature points.

5. A system as defined in claim 1 which further comprises another memory means for temporarily storing the image data relating to the article.

6. A method of detecting the orientation of an article comprising:

storing in a memory data relating to the distances between each one of a plurality of feature points of the article and each of the others of said plurality of feature points, picking up an image of the article by a camera and storing the resulting image data in another memory, and executing with use of a computer the steps of obtaining from the image data, stored in said another memory, data relating to the distances of at least two of the feature points of the article from other feature points, identifying said at least two feature points by checking the data relating to the distances of said at least two feature points from other feature points with reference to the data stored in said memory relating to the distances between each one of a plurality of feature points and the other feature points, and determining the orientation of the article based on a direction through the two identified feature points.

7. A method as defined in claim 6 wherein a checking range is set for the image data as to the article to obtain data relating to the distances between one specific feature point of said plurality of feature points within the checking range and each of the other specific feature points of said plurality of feature points within the checking range, and a different checking range is subsequently set for the image data to similarly obtain data relating to the distances between one specific feature point of said plurality of feature points within the different checking range and each of the other specific feature points of said plurality of feature points within the different checking range.

* * * * *